Feb. 15, 1966  M. G. IONIDES  3,234,741
LAYERS OR SCREENS FOR PREVENTING OR MINIMISING
FLUID FLOW THROUGH SURFACES

Filed Oct. 24, 1961  6 Sheets-Sheet 2

INVENTOR
MICHAEL G. IONIDES

BY
Watson, Cole, Grindle & Watson
ATTORNEYS

INVENTOR
MICHAEL G. IONIDES

BY *Watson, Cole, Grindle & Watson*
ATTORNEYS

INVENTOR
MICHAEL G. IONIDES
BY *Watson, Cole, Grindle & Watson*
ATTORNEY

Feb. 15, 1966  M. G. IONIDES  3,234,741
LAYERS OR SCREENS FOR PREVENTING OR MINIMISING
FLUID FLOW THROUGH SURFACES
Filed Oct. 24, 1961  6 Sheets-Sheet 6

INVENTOR
MICHAEL G. IONIDES
BY
Watson, Cole, Grindle & Watson
ATTORNEYS

United States Patent Office 3,234,741
Patented Feb. 15, 1966

3,234,741
LAYERS OR SCREENS FOR PREVENTING OR MINIMISING FLUID FLOW THROUGH SURFACES
Michael George Ionides, 21 Suffolk St., London, England
Filed Oct. 24, 1961, Ser. No. 147,222
Claims priority, application Great Britain, Oct. 28, 1960, 37,209/60; Apr. 14, 1961, 13,544/61
4 Claims. (Cl. 61—7)

This invention relates to layers or screens for preventing or minimising the flow of fluid through a surface on which the layer is supported and to methods of making such layers or screens, and an object of the invention is to provide a form of layer or screen for the purpose in question, and a method of making such layers or screens which, while using material which is comparatively inexpensive and readily available, will not require the employment of skilled labour.

According to the present invention, a layer or screen for preventing or minimising flow of fluid over or through a surface on which the layer is supported comprises a series of flexible membranes arranged side by side with adjacent side portions overlapping or otherwise engaging in a fluid tight manner, each membrane being formed to provide or having secured to it one or more flexible tubes extending along or generally parallel to its side portions and wholly or partially inflated or wholly deflated.

In the present specification the expressions "partially inflated" and "partially deflated" are used to refer to tubular membranes or tubes, each of which contains a volume of fluid or of two or more fluids (with or without a proportion of one or more solid substances) substantially less than its maximum volumetric capacity, the term "wholly inflated" is used to refer to tubes or tubular membranes each containing a volume of one or more fluids (with or without a proportion of one or more solid substances) substantially equal to its maximum capacity and the term "wholly deflated" is used as referring to tubes or tubular membranes which contain substantially no fluid, that is to say are in flattened form so as to constitute in effect two sheets of superimposed membrane.

In one form of the present invention comprising a layer or screen used for example as a lining upon the walls of a cavity in a liquid permeable material to form a liquid reservoir each of one set of alternate membranes comprises a single flexible tube and each of the other set of alternate membranes comprises two superimposed parallel tubes secured together along their lengths either directly or by a web, the arrangement being such that each of the longitudinal side portions of each tube of the first series lies between the adjacent side portions of the two tubes of a membrane of the second series.

In such a form the membranes are conveniently of synthetic plastic material such as polythene or the like or of aluminium foil, are partially inflated by a grout or slurry of water and one or more granular substances such as sand or earth with preferably a quantity of setting or binding material such as cement sufficient to bind the particles of sand or earth together, and are arranged so that each pair of adjacent side portions of membranes of the first set overlap, and are overlapped, by respective tubes of the membranes of the second series.

In an alternative form of layer or screen comprising a series of flexible membranes arranged side by side with adjacent side portions overlapping, at least a part of a portion of each membrane which overlaps an adjacent membrane comprises an inflated or partially inflated tube. Thus where such a layer is used for example, as an impervious lining in a cavity for use as a liquid reservoir, and each tube is inflated with slurry similar to that referred to above, on "setting" of the slurry each inflated tube acts as a substantially rigid "rib" which holds the underlying edge of the adjacent membrane against the supporting surface.

In a preferred arrangement to this alternative form, each side portion of each membrane comprises an inflated or partially inflated tube, with each tube lying in contact along its length with the adjacent tube of an adjacent membrane and a part of the adjacent membrane nearer the centre of such membrane than such adjacent tube. Thus that one of the two adjacent inflated tubes overlying a portion of the adjacent membrane acts as a "rib" to hold the adjacent membrane against the supporting surface while the two together act to secure the edges of the two adjacent membranes together to help prevent them being drawn apart.

In a further form of the present invention, each membrane in a layer or screen includes or has secured to it a series of flexible tubes arranged side by side and approximately parallel to one another.

Conveniently, in such a form the tubes of each membrane have their adjacent side portions in close contact and each membrane is of a flattened tubular form and comprises superimposed parts of which one is formed with the series of tubes for inflation or partial inflation while the other is in the form of a single layer of the sheet material of which the membrane is formed.

If desired in such a layer or screen, the flattened tubular membrane itself may be partially filled with slurry.

A layer or screen according to the invention is not limited to applications in which the layer or screen is used to provide a lining upon the walls of a cavity forming a liquid reservoir and may for example be applied to the surface of water to protect the water from evaporative action by the atmosphere and/or sun. In such an application the tubes are inflated or partially inflated with a fluid or fluids having a mean specific gravity of less than one to cause the layer to float upon the water.

A layer or screen according to the invention may comprise at least two series of flexible members one superimposed on the other with the lengths of the membranes in the respective series lying at a substantial angle to one another.

A method of forming a layer or screen according to the present invention includes the step of extending the membranes into position by introducing fluid into the flexible tubes.

Thus for example, where the membranes are of polythene and each membrane is in a flattened form and rolled up along its length, each membrane can be laid in turn upon the base of a cavity to be used as a liquid reservoir by connecting the outer ends of the or each tube of the membrane to a source of fluid such as a water supply pipe, so that the pressure of fluid as it fills the tube or tubes rolls the membrane out along the bottom of the cavity. Alternatively, if the tubes are to be filled with slurry, slurry may be pumped into the tubes instead of water to unroll the membranes.

A method according to the invention may also include the steps of laying over the surface a series of substantially parallel and partially or substantially wholly inflated tubular flexible membranes in contact with one another, and causing adjacent membranes to assume overlapping relationship by partially deflating the membranes in an appropriate order and in two or more steps to leave the membranes finally either partially or wholly deflated. Thus for example, alternate ones of the series of tubular flexible membranes can be deflated at least in part and then the remainder of deflated at least in part.

In a method of forming a layer or screen in which the membranes comprise or include a series of parallel tubes with their adjacent side portions in close contact, alternate tubes in each membrane may be substantially wholly inflated with slurry and then the remaining tubes inflated with slurry sufficient to result in there being formed a substantial area of contact between adjacent parts of the tubes along their whole lengths. Preferably, when the slurry includes a setting material the alternate tubes first inflated are allowed to set before the inflation of the remaining tubes.

A membrane for use in a layer or screen and for performing a method according to the invention is in the form of a continuous length of sheet material having formed therein or thereon or having attached thereto one or more open ended tubes of less width than the sheet material extending longitudinally thereof, the sheet material itself being preferably in the form of a tube of the full width of the material with the tubes of less width than the material being formed or secured in the main tube. A tube is conveniently formed in or on a membrane by uniting spaced longitudinally extending parts of the membrane to one another.

In one form the tubes of less width than the membrane lie adjacent the edges of the material while in another a series of tubes of less width than the membrane are arranged such that when inflated or partially inflated the tubes extend substantially complete across the width of the material. In yet another form the membrane comprises two tubes united along a narrow area extending longitudinally thereof.

A number of methods of forming screens or layers according to the invention, various forms of membranes for use in such methods and for embodiment in such layers and a number of applications of the invention will now be described by way of example only with reference to the accompanying drawings in which, FIGURE 5 is a similar view to FIGURE 4 showing the next step in applying the layer according to the invention.

Figure 1:
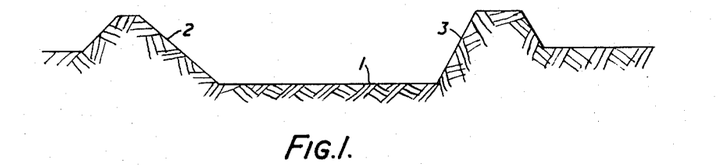
FIGURE 1 is a cross-section through a reservoir cavity assumed to be dug in the earth by the usual method of removing earth from the area to form the cavity and using the removed earth to form banks at the sides of the cavity so as to increase its effective depth.
Figure 2:
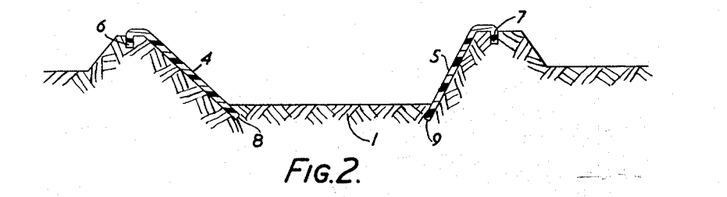
FIGURE 2 is a similar view to FIGURE 1 showing the first step in staunching the cavity, that is to say sealing its inner surface from passage therethrough of water.

Referring to FIGURES 1 to 7, it will be seen that the reservoir cavity illustrated therein comprises a bottom wall 1 and two sloping side walls 2 and 3. As shown in FIGURE 2 the first step in staunching the cavity is to apply over the side walls semi-rigid or flexible impervious membranes 4 and 5 having their upper edges turned over and buried, as shown at 6 and 7, and their lower edges buried below the bottom wall 1, as shown at 8 and 9.

Figure 3:
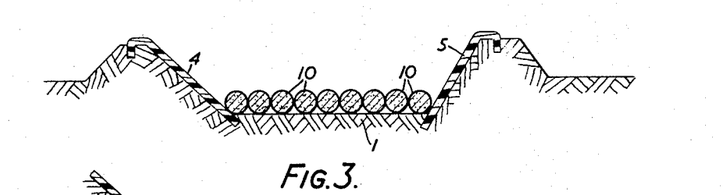
FIGURE 3 is a similar view of FIGURES 1 and 2 showing the next step, that is to say the initial step in applying to the bottom of the cavity a layer according to the invention.
Figure 4:
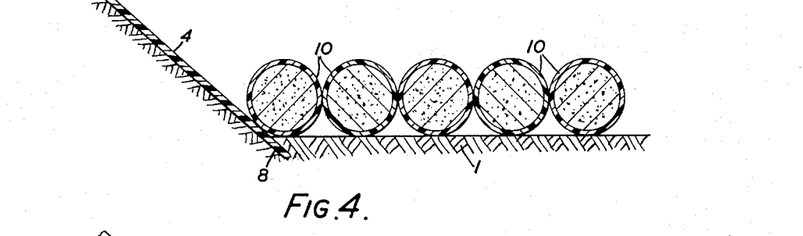
FIGURE 4 is an enlarged partial view on the same cross-section as FIGURE 3.
Figure 13:
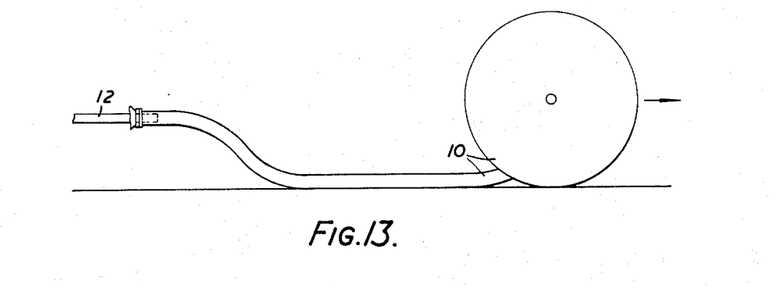

The next step, as shown in FIGURES 3 and 4, is to lay over the surface of the bottom wall 1 a layer or screen according to the invention comprising a row of thin tubular membranes 10. The membranes are laid alongside one another and substantially fully inflated with water and so that they completely cover the surface of the bottom wall 1. These tubular membranes are conveniently of thin polythene and each of them may be laid in turn, for example in the manner indicated in FIGURE 13, that is to say that flat rolled-up tubular membrane may be placed in the appropriate position at one end of the base of the reservoir and connected to a water supply pipe as shown at 11, so that the pressure of water as it fills the membrane also rolls the membrane out along the bottom of the reservoir cavity.

When the membranes have all been laid in the manner indicated in FIGURES 3 and 4, one set of alternate membranes are partly deflated by allowing water to escape from them, as shown in FIGURE 5, so that the partly deflated membranes bulge underneath the fully inflated membranes.

Figure 6:
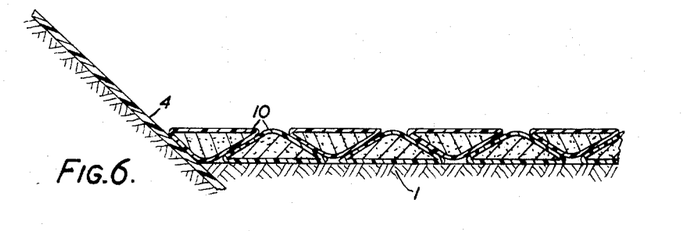
FIGURE 6 is a similar view to FIGURE 5 showing a still further step in the application of the layer according to the invention.

The next step is to deflate partially the other set of alternate membranes so that the membranes then take up the form as indicated in FIGURE 6.

Figure 7:
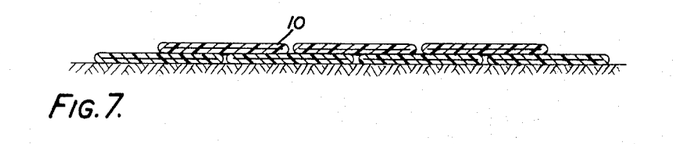
FIGURE 7 is a similar view to FIGURE 6 showing the layer as it may appear in its final form.

The membranes may either be left in this state or may finally be further or completely deflated so that in the latter case they lie flat in overlapping relationship upon the bottom of the reservoir cavity as shown in FIGURE 7.

After the membranes have thus been caused to assume the form and arrangement shown in FIGURE 6 or FIGURE 7 a second row of membranes extending at right angles to the first row may be laid so as to provide in effect two superimposed layers of membranes covering the bottom of the reservoir cavity.

Figures 8, 9:
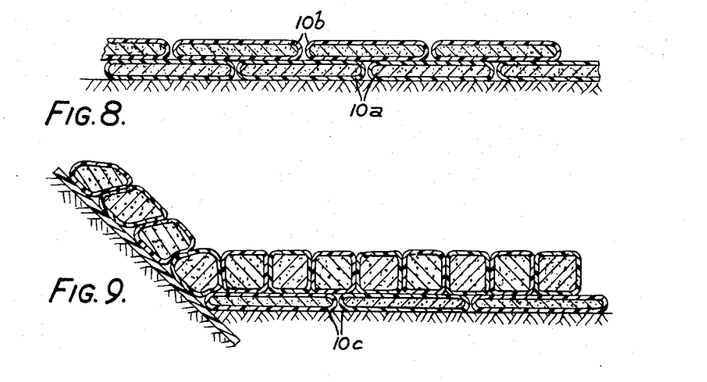
FIGURE 8 is a somewhat similar view to FIGURE 3 showing an alternative form of the invention as applied to a reservoir cavity.
FIGURE 9 is a somewhat similar view to FIGURE 2 indicating a still further alternative form which the invention may take when applied to a reservoir cavity.

Alternatively, as indicated in FIGURE 8, a first row of membranes 10a may be laid so that when deflated or partially deflated they lie edge-to-edge as shown, and a second row of membranes 10b may be laid over them and parallel to them so that they also lie edge-to-edge when deflated or partially deflated with the abutting edges of the membranes in the upper row approximately midway between the abutting edges of the membranes of the lower row.

In the further alternative indicated in FIGURE 9 in which membranes are shown arranged so as to cover a side wall of a reservoir cavity as well as the bottom wall, the membranes are filled during the laying operation with slurry comprising a mixture of water, cement and sand which is then allowed to set so as to provide the membranes with rigid cores. It will be seen that this provides a substantially impervious layer, of appreciable strength and capable of resisting substantial wear, extending over the bottom wall and side walls of the reservoir cavity. In this arrangement the membranes laid over the bottom wall may be of larger diameter than those laid over the side wall if desired. Moreover such a layer may if desired be laid over an impervious layer according to the invention formed as described with reference to FIGURES 1 to 7, as indicated at 10c.

Figure 10:
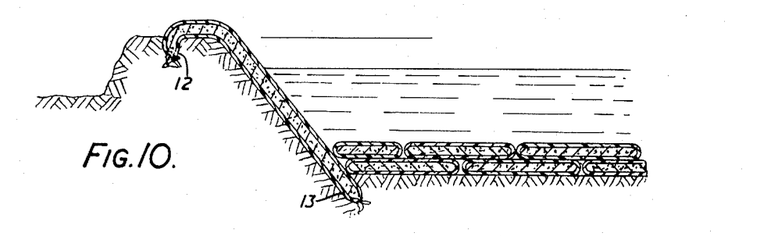
FIGURE 10 shows a modified arrangement of tubular membranes which may be employed in carrying the invention into practice, FIGURES 11A and B illustrate how the degree of inflation of the tubular membranes affects the area of contact between adjacent membranes.

In the still further alternative indicated in FIGURE 10 the bottom wall of the reservoir cavity may be considered as covered with membranes in one of the ways described immediately above, while a side wall or each side wall is covered with a row of membranes the ends of which are dug into the earth at the points indicated at 12 and 13, these membranes being inflated or partially inflated in such manner that adjacent membranes engage each other closely and make a water-tight seal. The membranes in this case may be filled or partially filled with liquid or a cement mixture so as to be flexible or rigid.

Figure 12:
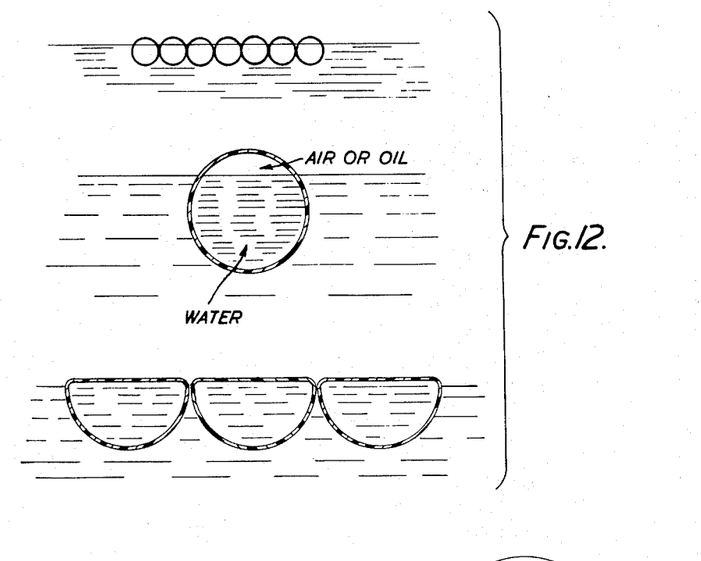
FIGURE 12 shows another form of the invention, FIGURE 13 indicates how tubular membranes according to the invention may be laid in place.

FIGURE 12 shows at A a form of the invention in which the tubular membranes are inflated partly with air and partly with water to form a surface covering for the water in a reservoir. The membranes may be of a form such as is shown at B if substantially fully inflated or such as is shown at C if less fully inflated.

Figure 11A:
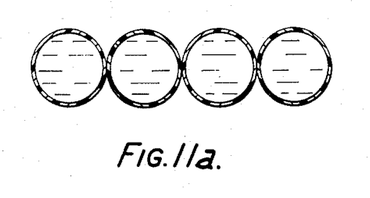
Figure 11B:
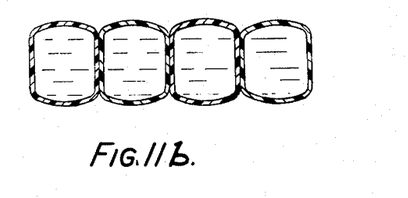

It will be apparent that in an arrangement such as is shown in FIGURE 10 or in other arrangements in which the membranes are left in an inflated or partially inflated form, the spacing of the membranes in relation to their diameters and their degree of inflation may be such as to provide between adjacent membranes any degree of contact with a range between substantially line contact as shown in FIGURE 11A and contact over a substantial "circumferential" area, as shown in FIGURE 11B over which area the tubular membranes will be flattened by contact with one another to a degree depending upon the dimensions, spacing and degree of inflation.

Figure 14:
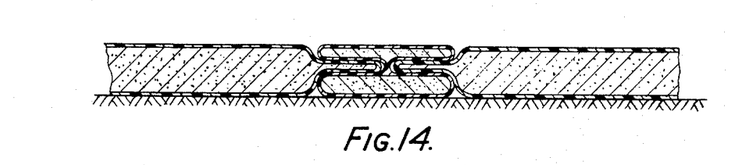
FIGURE 14 shows in cross-section a fragmentary portion of one form of layer or screen according to the invention.
Figure 15:
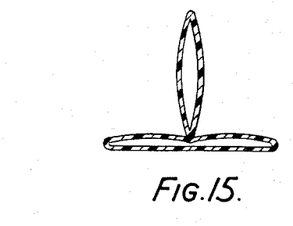
FIGURE 15 illustrates a form of membrane forming part of the layer of FIGURE 14.

In another form of screen or layer of which a part is illustrated in FIGURE 14, alternate membranes, which comprise single flexible tubes, are partially inflated with slurry so as to take up a flattened form and between them are positioned membranes each comprising two parallel tubes as illustrated in FIGURE 15 partially inflated with slurry and in flattened form, which two tubes being secured together along their lengths. The arrangement is such that the side portions of adjacent alternate membranes overlap one of the tubes of the membrane positioned between them and the other tube of said membrane in turn overlaps the two adjacent side portions of the adjacent alternate membranes.

Figure 16:
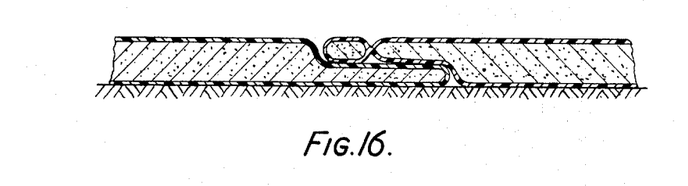
FIGURES 16 and 17 shows layers or screens embodying further forms of membrane.

Alternately each membrane may be of tubular form and have formed along the whole length of a side portion thereof a tube of appreciably smaller cross-sectional area than that of the membrane as a whole. The membranes are laid side by side and partially inflated with slurry, and the tubes substantially completely inflated with slurry and each arranged to overlie the adjacent side portion of the neighbouring membrane as shown in FIGURE 16. If such tubes are filled with the slurry including a portion of setting material, on setting of the slurry the tubes act as "ribs" which press the adjacent membrane against the supporting surface and so minimise risk of relative movement occurring between adjacent membranes under, for example, liquid pressures, currents and so on in the liquid stored in the reservoir.

Figure 17:
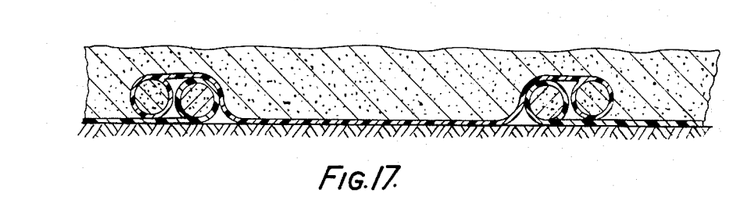

In a modification of the last described form, similar tubes of smaller cross-section are formed along each side portion of the membrane and are filled with slurry as before. Each tube is arranged to lie in contact along its length with a tube along the adjacent edge portion of the neighbouring membrane and with a part of the adjacent membrane nearer the centre of such membrane than such adjacent tube. Illustrated in FIGURE 17 is a further modification of the arrangement last described in which each membrane is not of tubular form, but is in the form of a sheet along the side portions of which are formed tubes filled with slurry and which are positioned as described above. If desired a "blanket" of slurry can be superimposed on the layer of screen as illustrated.

Figure 18:
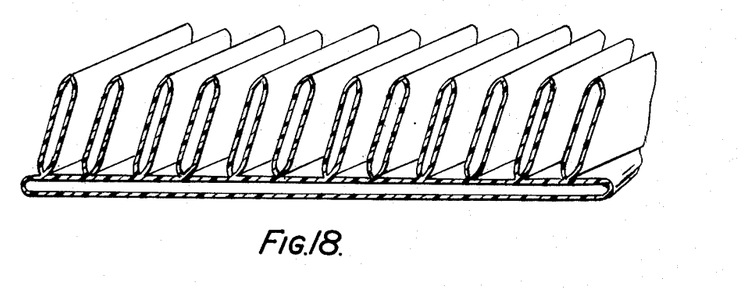
FIGURE 18 illustrates yet another form of membrane.
Figure 19:
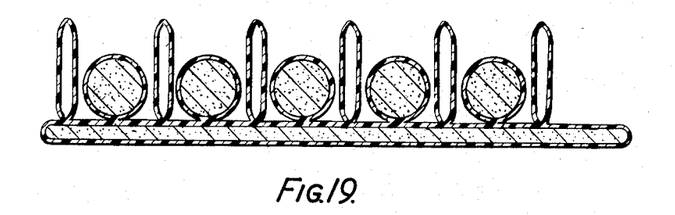
FIGURES 19 and 20 show the membrane of FIGURE 18 after successive steps in a method of making a layer embodying the said membrane.

In yet another form of the invention a series of membranes, each as illustrated in FIGURE 18, that is to say, each is of tubular form and has a series of tubes extending along it, are laid side by side with the tubes generally parallel with one another and then alternate tubes are substantially wholly inflated with slurry including a setting material as seen in FIGURE 19. After the slurry has set, the remaining tubes are inflated with slurry sufficiently for a substantial area of contact to be formed between the adjacent tubes along their whole lengths. Thus each tube will be such as to completely fill the gap between the two tubes next adjacent to it and so there is formed a substantially fluid-tight layer or screen lying upon the underlying permeable surface in the cavity walls or base.

The tubular membrane may itself be partially inflated if so desired and be arranged to overlie or underlie the tubes as required. In cases where the tubes are of synthetic plastic material, such as polythene, the material itself tends to act as a fluid-tight "gasket" between the slurry "cores" lying within the tubes. A layer or screen so formed is substantially liquid tight and is capable of withstanding substantial weight and wear.

Figure 20:
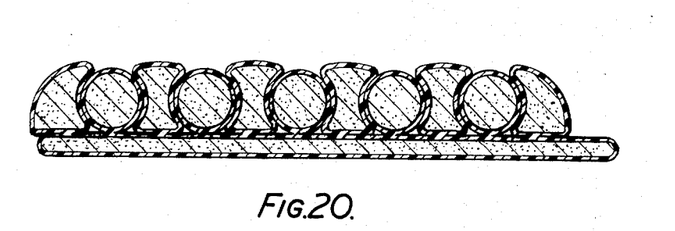

By substantially wholly inflating alternate tubes and subsequently inflating the remainder, since the alternate ones become generally circular in cross-section, the spaces between them in which the remaining tubes lie are when viewed in a direction along the length of the tubes, necessarily "waisted" as shown in FIGURE 19 of the drawings, and thus when the remaining tubes are inflated so that the said spaces are substantially wholly filled, as shown in FIGURE 20, adjacent tubes become interlocked so that no one tube can be lifted or driven out without displacing adjacent tubes. Also the tubes are anchored down by their attachment to the underlying membrane, if such is provided.

Figure 21:
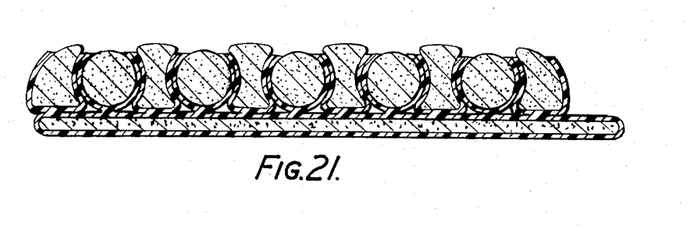
FIGURE 21 shows in cross-section a portion of a layer of which the upper parts of the membrane have been worn away.

When and if parts of the tubes are worn away, or are damaged by wear or by exposure to light, air and weather, as shown in FIGURE 21, the parts of the membranes in contact with one another and lying between adjacent "cores" will generally remain intact and thus still ensure that little leakage occurs between the adjacent cores. Furthermore, an underlying membrane, if present, acts to reduce or prevent leakage.

The ends of the tubes which are conveniently carried up over the edges of the cavity in the manner described above are closed by tying with string for example, until the slurry containing a suitable setting material, such as cement, for example, has set.

Figure 22:
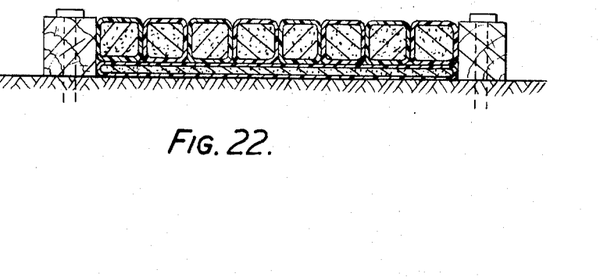
FIGURES 22 and 23 illustrate layers or screens formed according to a further method according to the invention.

In an alternate method each membrane similar to that shown in FIGURE 18 is laid out on at least a part of the cavity walls with the tubes uppermost, walls are placed along opposite sides of the membrane and generally parallel with the lengths of the tubes, and the tubes then simultaneously inflated with slurry, at least in part, the slurry including a suitable binder, and allowing the slurry to set. By "walls" are meant means which are arranged to cause the tubes to be compressed together laterally as they are being filled with slurry so that, when considered in cross-section, the tubular membranes are caused to take up a form which is elongated in a direction generally perpendicular to adjacent parts of the cavity walls as illustrated in FIGURE 22.

Such walls may comprise baulks of timber pinned or otherwise to the cavity walls and removable after the slurry has set. Of course, if further membranes are laid alongside the one already laid, an already filled tube of the membrane already laid can act as one of the two walls required during the filling of the tubes of the adjacent membrane.

Figure 23:
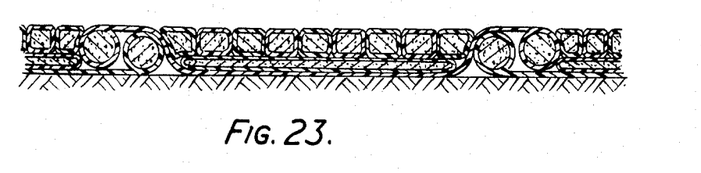

In an alternative method, when a number of membranes of the last mentioned type are to be laid alongside one another to form a continuous layer or screen the membranes are laid with the lengths of the tubes generally parallel with one another and with the edges of the membranes overlapping, and the outermost tube of each membrane then filled with slurry which is allowed to set, the skins having been arranged so that each outermost tube which is super-imposed upon an overlapped edge of an adjacent membrane lies alongside and in contact with the adjacent outermost filled tube of the adjacent membrane along its whole length, but with its longitudinal axis laterally displaced from that of the contacting tube inwards towards the centre of the neighboring membrane in the manner shown in FIGURE 23. Thus the two contacting tubes act as anchoring members preventing accidental drawing apart of the adjacent edges of the membranes and also act together to form "walls" as described above during the inflation of the other tubular membranes with slurry. A suitable space may be left between the outermost tube and the next adjacent tube of each membrane to accommodate the outermost tube of the adjacent membrane or one or more tubes next to the outermost tube may be allowed to remain substantially wholly deflated.

Of course in any of the arrangements described above, the screen or layer according to the invention may consist of two or more membranes superimposed one upon another with the lengths of the tubes of superimposed membranes preferably arranged at substantial angles, for example, 90° with respect to each other.

In cases in which layers or screens according to the invention are used as linings in liquid reservoirs for example, slurry or grout inflating the tubes preferably includes a suitable binder sufficient to enable it to set, but it is not essential that the amount of binder is greater than that amount necessary to hold the solid matter of the slurry in shape after setting. In cases however, where the layers or screens are to be used as linings in canals, for example, an increased amount of binder should preferably be used in order to increase the resistance of the layers or screens to wear. In such canals the membranes may be laid with the lengths of the tubes lying either parallel with or transversely to the direction of any flow of liquid in the canal or at other chosen angles with the direction of flow.

Membranes of the present invention have applications in forming layers or screens comprising the beds of flumes, or the walls of well shafts and so on, as well as linings for liquid reservoirs, canals and the like, and such screens or layers may be laid both above and below the surface of the liquid when the canals, reservoirs, flumes, and so on are wholly or partially filled with liquid, or when they are empty.

Where a structural strength is required which is somewhat greater than that provided in layers or screens formed with membranes of polythene, the membranes may be formed of aluminium foil for example. Thus grout or slurry can be forced into the tubes thereof in excess of that quantity required to completely inflate them and so put the aluminium of the tubes into a state of stress which acts to reinforce the structural strength of the combined tube and slurry core. The tube walls, if desired, can be "dimpled" or "pimpled" to increase the bond between the core and the tube. In any event, whatever the material forming the membranes, the cores within the tubes can be reinforced by inserting rigid rods or lengths of wire along their lengths.

In a further application of layers or screens as described above, the layer or screen is used to form the base of a filter bed whether the filter bed is used solely or primarily for filtering purposes or combines the functions of both filter bed and reservoir.

Thus a layer or screen according to the invention may be overlaid by a series of layers of material such as rock, gravel sand and so on the layer next adjacent the screen being composed mainly of coarse particles of a size in excess of a determined value, with each succeeding layer overlying it being composed mainly of particles of a progressively diminishing size in the manner of a filter, there being a delivery conduit or pipe passing into one or other of the underlying layers, preferably the layer next adjacent the screen, from which underlying layer water which has passed into it through the layers superimposed upon it can be drawn away.

Such a delivery conduit may for example, deliver the water to the bottom of a well shaft sunk adjacent the said reservoir or canal, the walls and bottom of which may be lined with a screen or layer according to the invention.

By an appropriate series of graded layers, the water delivered through the delivery conduit will be of drinkable quality whatever the quality of the water delivered to the filter bed.

Figure 24:
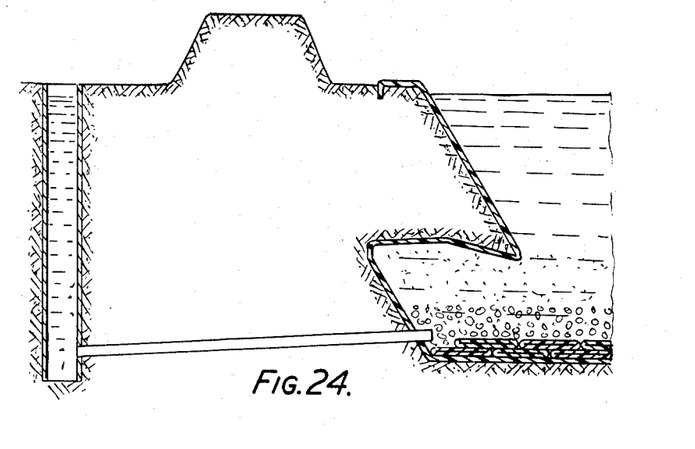
FIGURE 24 shows, in diagrammatic form, a layer according to the invention forming the base of a filter bed underlying an irrigation canal.

One such layer or screen laid below the bed of an irrigation canal is shown in FIGURE 24.

It will be appreciated that the various methods of using tubular membranes to provide layers or screens substantially impervious to fluid as described above may be combined, that is to say one method may be used for part of the surface of a reservoir cavity or the like while one or more other methods may be used for one or more other parts of the surface, the method or methods being chosen according to the purpose for which the reservoir is intended, the strength required, the purpose of the layer or screen and other considerations.

What I claim as my invention and desire to secure by Letters Patent is:

1. An impervious membrance for forming part of a lining layer for a liquid reservoir comprising an impervious flexible sheet material to one face of which are attached a series of parallel longitudinally extending open-ended tubes separated from one another by longitudinally extending parallel areas of said sheet material, the diameter of each of the longitudinally extending tubes when fully inflated being greater than the distance between the centers of the points of attachment of the tubes to the sheet material, whereby when said tubes are inflated substantial areas of adjacent tubes will lie in contact with each other.

2. An impervious surface layer preventing seepage from a reservoir comprising at least one impervious membrane as claimed in claim 1 wherein said tubes are filled with a rigid material.

3. An impervious surface layer preventing seepage from a reservoir comprising at least one impervious membrane, said membrane comprising an impervious flexible sheet material in the form of a flattened tube to one face of which are attached a series of parallel longitudinally extending open-ended tubes separated from one another by longitudinally extending parallel areas of said sheet material, said parallel longitudinally extending tubes being completely filled with rigid material and said flattened tube being filled with rigid material forming a flat rigid base on which said longitudinally extending tubes attached thereto rest.

4. An impervious surface layer preventing seepage from a reservoir comprising at least one impervious membrane, said membrane comprising an impervious flexible sheet material to one face of which are attached a series of parallel longitudinally extending open-ended tubes separated from one another by longitudinally extending parallel areas of said sheet material, said flexible sheet material being in the form of a flattened tube, the alternate parallel longitudinally extending tubes being completely filled with rigid material such that they are substantially cylindrical, the parallel longitudinally extending tubes located between each of said cylindrical being filled with rigid material such that these latter tubes are concave along the opposite sides to conform to the shape of said neighboring cylindrical tubes, and said flattened tube being filled with rigid material forming a flat rigid base on which said longitudinally extending tubes attached thereto rest.

References Cited by the Examiner
UNITED STATES PATENTS

| | | | |
|---|---|---|---|
| 983,209 | 1/1911 | Conde | 61—38 |
| 2,724,418 | 11/1955 | Krupp | 150—5 |
| 2,922,344 | 1/1960 | Meissner | 61—1 X |

FOREIGN PATENTS

| | | |
|---|---|---|
| 560,165 | 9/1957 | Belgium. |
| 1,209,649 | 9/1959 | France. |
| 148,767 | 5/1921 | Great Britain. |
| 69,193 | 12/1951 | Holland. |
| 87,531 | 2/1958 | Netherlands. |

CHARLES E. O'CONNELL, *Primary Examiner.*

WILLIAM I. MUSHAKE, JACOB SHAPIRO, EARL J. WITMER, *Examiners.*